D. A. BUSCH.
GRAB OR DRAFT HOOK.
APPLICATION FILED MAR. 27, 1909.

938,551.

Patented Nov. 2, 1909.

Witnesses.
T. J. Glover
L. L. Curl

Inventor.
David A. Busch
by R. C. Wright
Attorney.

UNITED STATES PATENT OFFICE.

DAVID A. BUSCH, OF RAINIER, OREGON.

GRAB OR DRAFT HOOK.

938,551. Specification of Letters Patent. Patented Nov. 2, 1909.

Application filed March 27, 1909. Serial No. 486,221.

*To all whom it may concern:*

Be it known that I, DAVID A. BUSCH, a citizen of the United States, residing at Rainier, in the county of Columbia and State of Oregon, have invented a new and useful Improvement in Grab or Draft Hooks, of which the following is a specification, reference being had to the accompanying drawings.

My invention relates to the class of draft hooks used in moving logs, timbers and other heavy objects.

The object of my invention is to provide a device in which there is arranged a swiveled hook or grab having a chain holding ring and a slotted disk for the purpose of locking the links of a chain within the hook when placed therein. I attain these objects as well as other advantages, by the mechanism, construction, combination and arrangement of parts illustrated in the accompanying drawings, which form a part hereof.

Figure 1:
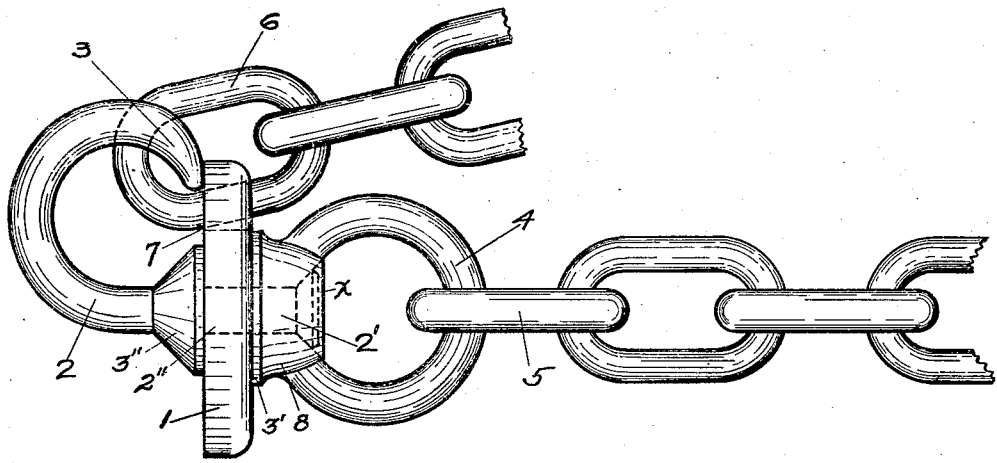
Figure 2:
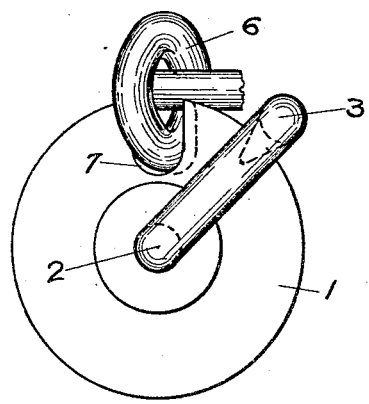
Figure 3:
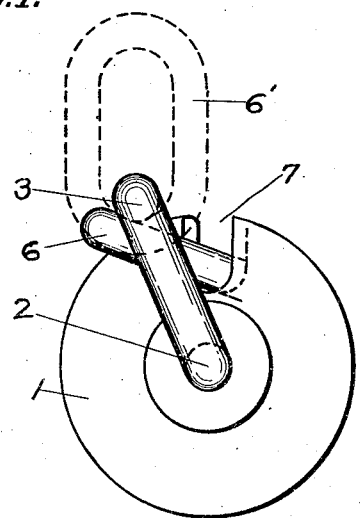
Figure 4:
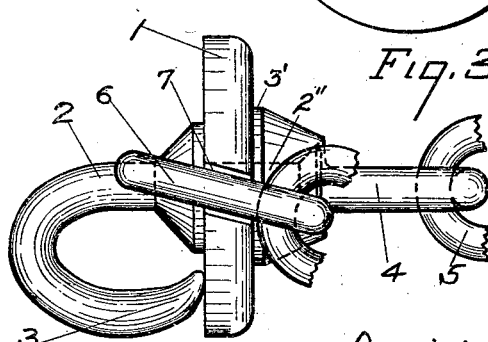

Figure 1 is a side elevation of the hook with its holding chain secured within the ring and the link of an engaged chain within the slot of the disk lock and at one side of the hook. Fig. 2 is an end elevation of the device as shown in Fig. 1 but with the holding chain not visible. Fig. 3 is a similar end view as in Fig. 2 but with the link of the engaged chain in horizontal position and within the bill of the hook. Fig. 4 is a top plan view of the device as shown in Fig. 1 with the hook slightly rotated.

Like numerals and letters refer to like parts in all views.

A chain holding ring 4 is provided with an integral swivel body 8 having an opening 2'' through the same and an outward face 3'. A hook 2 is provided, having a shank 2' extending through the opening 2'' of the swivel body, with an end rivet head X within the ring rotatably engaging the inner counter bored end of the opening 2''. The shank is also formed with a boss 3'' oppositely disposed to the face 3' of the swivel body and at a suitable distance therefrom to admit the locking disk 1 between the same when the shank is rotatably secured in the ring.

A locking disk 1, formed with a diagonal slot 7 in its rim, is pivotally mounted on the shank 2' of the hook, and between its boss and the face 3' of the swivel body. An end link 5 of a holding chain is secured to and through the ring 4. An end link 6 of an engaged chain is shown in Figs. 1, 2 and 4 within the slot 7 of the disk, in a vertical position and alongside the bill 3 of the hook. In Fig. 3 the link 6 of the engaged chain is shown moved to a horizontal position from its dotted line position 6', with the bill of the hook rotated toward the left and over the link. When in this position the link 6 is moved within, upward and over and into engagement with the hook 2 as shown in Fig. 3. The slot of the disk may be then moved to the side opposite the hook-bill by rotating the disk. In Fig. 1 the link 6 is shown inserted in the slot 7. It will now be seen that when the link 6 of the engaged chain is placed in the slot 7 of the disk 1, vertically alongside the bill of the hook 2, the hook is slightly rotated, the link being at the same time moved to a horizontal position while in the slot 7 and the disk being held stationary. The link having thus been brought beneath the hook-bill, it is then moved within the hook, upward and over until it is brought into engagement with it. The disk is then moved so the slot is no longer facing the bill. The slot being diagonal and the rim of the disk close to the hook-bill it will be clearly seen that it is impossible for the disk to be so shaken or moved that the link will pass out of the hook, except in moving the disk by hand, when reversing the operation of inserting the link in the hook. In that manner only can it be removed.

It will thus be seen that I have provided a safety grab-hook with a locking disk which will positively and securely retain the link of an engaged chain within the hook until it is desired to release it from engagement therewith. I contend that my device with the locking disk formed as shown, provides a safety hook differing in respect to any other known.

Having fully described my invention, I claim:

1. A swiveled grab-hook, provided with a locking disk 1 formed with a diagonal slot in its rim and pivotally mounted on the hook-shank between a boss thereon and an oppositely disposed face of the swivel body.

2. In a swiveled grab-hook, the combination with a hook, of a locking disk formed with a diagonal slot in its rim and pivotally mounted upon the hook-shank between the bill of the hook and the swivel body.

3. In a swiveled grab-hook, a locking disk having a diagonal slot in its rim and pivotally mounted upon the shank of the hook between its bill and the swivel body.

DAVID A. BUSCH.

Witnesses:
I. B. E. BOURNE,
FLOYD BURNHAM.